United States Patent [19]

Feugier et al.

[11] Patent Number: 5,091,120
[45] Date of Patent: Feb. 25, 1992

[54] PROCESS FOR OBTAINING $UO_2$ FUEL PELLETS FROM METALLIC U WITHOUT PRODUCING ANY EFFLUENT

[75] Inventors: André Feugier, Chatuzange-le-Goubet, France; Michel Pirsoul, Turnhout, Belgium

[73] Assignee: Uranium Pechiney, Courbevoie, France

[21] Appl. No.: 617,650

[22] Filed: Nov. 26, 1990

[30] Foreign Application Priority Data

Dec. 5, 1989 [FR] France .............................. 89 16737

[51] Int. Cl.$^5$ .............................................. G21C 21/00
[52] U.S. Cl. ..................... 264/0.5; 423/260; 423/261; 501/152
[58] Field of Search ............. 264/0.5; 75/399; 423/260, 261; 252/638, 643; 501/152

[56] References Cited

U.S. PATENT DOCUMENTS

| | | | |
|---|---|---|---|
| 3,547,598 | 12/1970 | Knudsen | 423/261 |
| 3,761,546 | 9/1973 | Wilhelm et al. | 264/0.5 |
| 4,020,146 | 4/1977 | Knudsen | 423/261 |
| 4,079,120 | 3/1978 | Cole et al. | 423/261 |
| 4,297,305 | 10/1981 | Lee et al. | 264/0.5 |
| 4,483,806 | 11/1984 | Börner et al. | 264/0.5 |
| 4,578,229 | 3/1986 | Assmann et al. | 264/0.5 |
| 4,643,873 | 2/1987 | Hayes | 419/33 |
| 4,965,024 | 10/1990 | Wood | 264/0.5 |
| 5,009,817 | 4/1991 | Hodgson | 264/0.5 |

*Primary Examiner*—Brooks H. Hunt
*Assistant Examiner*—Ngoclan T. Mai
*Attorney, Agent, or Firm*—Dennison, Meserole, Pollack & Scheiner

[57] ABSTRACT

Process for obtaining nuclear fuel pellets, which produces no liquid effluent, for which the starting product is metallic uranium, which is oxidized to $U_3O_8$, then crushed and either reduced to $UO_2$ and activated (or vice versa) with the aid of at least one fine milling operation, or reduced to $UO_2$ and activated using at least one oxidation-reduction cycle, the $UO_2$ obtained then being shaped by pressing and fritting and the intermediate powders obtained are dense and pourable, no intermediate conditioning operation being required.

32 Claims, No Drawings

5,091,120

PROCESS FOR OBTAINING UO₂ FUEL PELLETS FROM METALLIC U WITHOUT PRODUCING ANY EFFLUENT

TECHNICAL FIELD

The invention relates to a process for the production of fritted $UO_2$ nuclear fuel pellets from metallic uranium, resulting more particularly from laser isotopic enrichment, whereby said process leads to no liquid effluents.

STATE OF THE ART

Conventionally, when starting with metallic uranium, nuclear quality $UO_2$ fritted fuel pellets are obtained by using a so-called wet route process involving a series of long, expensive chemical operations giving rise to effluents, which it is necessary to process and dispose of.

They generally consist of firstly dissolving the metal in a nitric medium and then, on the basis of the solution obtained, precipitating the uranium in diuranate form, or treating said solution by a selective precipitation, e.g. with the aid of hydrogen peroxide, followed by the filtration of the pastes obtained, drying, calcining and then reducing the oxide obtained into $UO_2$ with the aid of hydrogen or cracked ammonia. Each of these operations gives rise to uraniferous residues which it is necessary to recycle and also effluents are obtained, particularly during purification and precipitation, from which it is necessary to remove the uranium, followed by disposal.

In the case of the thus obtained $UO_2$ powder, it is generally necessary to carry out granulation prior to the pressing of the pellets and the fritting thereof for the purpose of obtaining fuel pellets.

OBJECT OF THE INVENTION

The object of the invention is to provide a process for obtaining fritted fuel pellets from metallic uranium, which is simple and direct, produces no liquid effluents, leading to directly pourable uranium oxide intermediate powders, i.e. requiring no conditioning operation such as granulation, and having an adequate frittability under standard conditions to obtain fuel pellets. Another object is to obtain a uranium oxide intermediate powder usable for producing after mixing with other metal oxides, e.g. Pu, Th, Ce or neutrophage elements, fritted, mixed fuel pellets, once again without prior granulation.

Obviously, the fuel pellets obtained according to the inventive process comply with the specifications for nuclear fuels, more particularly a fritted density above 95% of the theoretical density and an excellent thermal stability. Moreover, in the crude state, they have an equivalent or improved strength.

DESCRIPTION OF THE INVENTION

The invention relates to a process for obtaining fritted nuclear fuel pellets based on $UO_2$ from metallic uranium, which does not produce any liquid effluent and which leads to intermediate uranium oxide powders which are dense and directly pourable without requiring any conditioning operation such as granulation, characterized in that the metallic uranium is oxidized by an oxidizing gas at high temperature in order to obtain an oxide of type $U_3O_8$, which is crushed or milled to bring about an average grain size of approximately 10 to 30 $\mu m$ and then either it is reduced chemically to the state of uranium oxide of type $UO_{2+x}$ followed by the activation thereof by at least one fine gas jet milling operation (jet mill) or vice versa, or it is activated by a heat treatment constituted by a reduction and at least one an oxidation-reduction cycle, the thus obtained activated $UO_{2+x}$ powder being directly shaped by compression and then fritted.

The starting metallic uranium is in solid or divided form and is generally oxidized by air or a gaseous mixture containing oxygen and optionally steam.

In a dry atmosphere, normally a temperature of 600° C. is not exceeded. Above this temperature, hard oxide blocks are obtained, which are difficult to use. Preference is given to 400° to 550° C.

The oxidation rate increases in the presence of steam and the temperature can be raised to 800° C., but preference is given to 600° to 750° C. This is followed by coarse grinding of the $U_3O_8$ powder obtained to an average grain size of approximately 10 to 30 $\mu m$.

In the case where the powder obtained is activated by gas jet milling, the reduction takes place with the aid of pure or diluted hydrogen, e.g. 50% hydrogen and 50% nitrogen or cracked $NH_3$, at a temperature above 550° C. and preferably between 600° and 700° C. Gas jet milling activation can take place on the reduced and stabilized powder without having any significant influence on the O/U ratio. This activation corresponds to an increase in the specific surface of the powder, which passes from approximately 0.5 $m^2/g$ on coarsely ground $U_3O_8$ to at least 1.5 $m^2/g$ and preferably between 1.7 and 3.5 $m^2/g$.

Alternatively, it is possible to limit the gas jet milling and complete the activation by at least one an oxidation-reduction cycle performed on the reduced oxide.

It is important to point out that it is standard practice to use fluidized bed gas jet milling, the apparatus having no impact plate or the like which is struck by the powder jet.

For carrying out such milling use is made of an enclosure at the bottom of which are located several jets for supplying at high speed a clean gas (not containing powder). The jets produced by these nozzles converge at a single point. The enclosure is also supplied with powder to be milled, which is put into movement by the gas jets and which is milled at the convergence point by auto-attrition or inter-particular impacts. The gas-particle suspension or aerosol is discharged from the enclosure and separated by all known means (e.g. cycloning), whilst recovering on the one hand the milled powder and on the other the dust-removed gas, which is recycled to the nozzles after having been recompressed.

This fluidized bed gas jet milling consequently makes it possible to avoid any pollution of the powder during milling, which could be brought about when using impact plates or nozzles traversed by a mixture of gas and powder, avoids the production of gaseous effluents, the vector gas being recycled and leads to a directly milled powder, which is completely usable for fritting, no powder recycling being required. It is remarkable to note that this process is so efficient, that it makes it possible to unexpectedly obtain an oxide of the type $UO_{2+x}$ in a direct and very easily frittable manner, because the density of the fritted end product generally exceeds 96% of the theoretical density. It should be noted that this result is also obtained when milling is carried out prior to reduction, which is not generally obtained with the prior art processes.

In the case where the said coarsely milled $U_3O_8$ powder is activated with the aid of at least one an oxidation-reduction cycle, it is reduced at a temperature above 550° C. and preferably between 600° and 700° C., under a hydrogen-containing atmosphere. It is then oxidized in the presence of an oxygen-containing gas at below 600° C. and preferably between 400° and 500° C. and is then reduced again as hereinbefore. If the oxidation temperature is too high, it is not possible to obtain a final powder with an adequate activity, having a good fritting aptitude, the latter being e.g. evaluatable by the BET specific surface.

The choice of the oxidation and reduction temperatures makes it possible to modulate the specific surface of the final uranium oxide powder and it is possible to increase the number of redox cycles until a uranium oxide powder is obtained having the desired specific surface. It generally exceeds 1.5 $m^2/g$ and is preferably between 1.7 and 3.5 $m^2/g$.

In both the aforementioned powder activation cases, dense, pourable uranium oxide powders are obtained, which can be pelletized under conventional conditions, without any prior granulation, in order to obtain crude or raw pellets having a density generally between 5.50 and 6.90 $g/cm^3$. Said crude pellets can be fritted under conventional conditions, e.g. 3 to 4 h at 1700° to 1750° C. under a hydrogen or hydrogen and nitrogen atmosphere, or at 1100° to 1300° C. under an oxidizing atmosphere, followed by a reduction at the same temperature in the presence of a hydrogen-containing gas. The final pellets obtained have a density of at least 95% of the theoretical density and normally above 96% of the theoretical density.

By comparison, uranium oxide powders obtained by metallic uranium oxidation (with or without the presence of steam) and which have not been activated have a specific surface generally not exceeding approximately 1 $m^2/g$ and lead to final fritted pellets, whose density is generally below 90% of the theoretical density, no matter what the crude density of the pellets used, which is inadequate and unacceptable for the use of such fritted fuel pellets in nuclear reactors.

When it is wished to produce mixed oxide fuel pellets, prior to pelleting mixing takes place of the activated uranium oxide powder with at least one metallic oxide powder having an appropriate grain size, e.g. an oxide of Pu, Th, Ce, Gd, Hf, etc.

Thus, the invention makes it possible to obtain fritted nuclear fuel pellets starting from metallic uranium using a very direct process and which does not generate liquid or in general even gaseous effluents, whose storage, treatment and disposal are normally difficult and costly. It also requires no stage of granulating the intermediate uranium oxide powders obtained prior to pelleting.

Such a so-called dry route process is also particularly interesting in nuclear fuel production, because the criticality problems are simplified through the absence of water.

Redox activation offers the advantage compared with gas jet milling of simplifying the problems of treating the gaseous effluents, the gas volume to be treated being much lower and the scrubbing of the gases being easier, because they contain very little or no suspended uranium oxide powder. The crude pellets obtained by this process also have an improved strength.

EXAMPLE 1

This example illustrates the two activation variants during the process according to the invention.

A diameter 15 mm, length 10 cm uranium bar was oxidized in the presence of air at 600° C. for 8 h. This gave a coarse $U_3O_8$ powder crushed until a powder with an average grain size of approximately 27 $\mu m$ was obtained. This powder was subdivided into two parts.

The first part (test 1) was activated by passing into a fluidized bed gas jet mill to give a powder with an average grain size of approximately 2 $\mu m$. It was then reduced to $UO_2$ by a mixture of $H_2$ (20 l/min) and $N_2$ (8 l/min) at 600° C. for 5 h.

The $UO_2$ powder obtained was passivated at 50° C. for 3½ hours by an air-nitrogen mixture progressively enriched with air to 37% by volume. Its specific BET surface was then 1.74 $m^2/g$, its average grain size 2.1 $\mu m$ (laser grain size distribution carried out with the aid of the CILAS apparatus) and its apparent specific mass was 1.48 $g/cm^3$.

The uranium oxide powder obtained with the characteristics described hereinbefore was shaped by compacting and then fritted at 1740° C. for 3 h under hydrogen.

The density results of the fritted pellets are between 96.62 and 97.11% of the theoretical density of the uranium oxide and appear in table 1 (test 1).

The second part (test 2) of the crushed $U_3O_8$ powder was firstly reduced to the $UO_2$ state and passivated under the same conditions as hereinbefore, followed by activation with the gas jet mill under the following conditions:

Milling pressure, 6 bars relative at the end of the test, turbine rotation speed: 15,000 r.p.m.

The uranium oxide powder obtained had a specific surface of 2.04 $m^2/g$, an average grain size of 0.8 $\mu m$ (CILAS laser granulometer) and an apparent specific mass of 2.03 $g/cm^3$.

The powder was shaped and fritted under the same conditions as in test 1. The density results of the fritted pellets are between 96.85 and 97.03% of the theoretical density and appear in table 1 (test 2).

TABLE 1

| Test No. | $UO_2$ before compacting: specific surface $m^2/g$ | Compacting pressure MPa | Compacting pressure $t/cm^2$ | Crude pellet density $g/cm^3$ | Fritted pellet density % of theoretical density |
|---|---|---|---|---|---|
| 1 | 1.74 | 290 | 2.96 | 6.45 | 96.62 |
|   |      | 368 | 3.75 | 6.65 | 96.95 |
|   |      | 425 | 4.34 | 6.81 | 97.11 |
| 2 | 2.04 | 290 | 2.96 | 6.49 | 96.85 |
|   |      | 368 | 3.75 | 6.65 | 96.94 |
|   |      | 425 | 4.34 | 6.78 | 97.03 |

It should be noted that in this example the compacting pressures are particularly low, but still correspond to crude and fritted densities well above the normal.

EXAMPLE 2

This example compares pellets obtained without an activation treatment and those obtained with an activation treatment, the results being given in table 2.

Firstly a metallic uranium bar was oxidized with air at a temperature between 450° and 550° C. for 8 h. This powder was crushed to 10 $\mu m$ in the manner described in example 1 and then divided into two parts (batches 1 and 2).

The first part (batch 1) was reduced under 50% hydrogen: 50% nitrogen at 600° C. for 4½ hours and then screened to 250 μm. Its specific surface was 1.05 m²/g. Its average grain size was 7 μm (Sedigraph sedimentation granulometer) and its apparent specific mass was 2.06 g/cm³. The thus obtained uranium oxide powder was subdivided into two further batches:

Batch 3 was directly shaped without granulation and then fritted under hydrogen at 1700° C. for 4 h. The densities of the fritted pellets were between 87.35 and 89.26% of theoretical density, despite the good crude densities (table 2, test 3).

Batch 4 was granulated and then shaped and fritted under the same conditions as batch 3. Thus, optimum conditions existed for obtaining good densities of the fritted pellets. The fritted densities were between 89.26 and 89.58% of the theoretical density (table 2, test 4). They are better than the previous values, but are still inadequate.

The second part (batch 2) of the coarsely milled $U_3O_8$ powder was firstly reduced to the state $UO_2$ by treatment under hydrogen identical to that carried out for batches 3 and 4. It was then activated by an oxidation-reduction treatment under the following conditions:

| Oxidation: | temperature | 400° C. |
|---|---|---|
| | atmosphere | air (10 m³/h) |
| | residence time | 6 h |
| Reduction: | temperature | 600° C. |
| | atmosphere | $H_2$ (3 m³/h) + $N_2$ (3 m³/h) |
| | residence time | 6 h. |

The powder obtained had an average grain size of 4.8 um (Sedigraph granulometer) a BET specific surface of 3.49 m²/g and an apparent specific mass of 1.38 g/cm³.

It was then directly shaped without prior granulation and then fritted in the manner described hereinbefore ($H_2$, 1700° C., 4 h). The fritted densities obtained were between 95.83 and 96.73% of the theoretical density (table 2, test 5).

Table 2 also shows the strength of the crude pellets, which are generally shaped like cylinders of limited height. The test consists of inserting the pellet between two parallel planar jaws bearing on two diametrically opposite generatrixes of the pellet and measuring the force necessary for breaking, the value being given in table 2.

TABLE 2

| Test No. | $UO_2$ before compacting: specific surface m²/g | Compacting pressure MPa (t/cm²) | Crude pellet density g/cm³ | Fritted pellet density, % of theoretical density | Strength of crude pellets daN |
|---|---|---|---|---|---|
| 3-1 | 1.05 | 200 (2.04) | 5.60 | 87.35 | 3.4 |
| 3-2 | 1.05 | 242 (2.47) | 5.80 | 88.17 | 4.3 |
| 3-3 | 1.05 | 303 (3.09) | 5.80 | 88.92 | 7.0 |
| 3-4 | 1.05 | 345 (3.52) | 6.10 | 89.26 | 10.0 |
| 4-1 | 1.05 | 187 (1.91) | 5.60 | 89.26 | 3.4 |
| 4-2 | 1.05 | 229 (2.34) | 5.80 | 89.47 | 4.6 |
| 4-3 | 1.05 | 290 (2.96) | 6.00 | 89.34 | 6.5 |
| 4-4 | 1.05 | 332 (3.39) | 6.20 | 89.58 | 7.5 |
| 5-1 | 3.49 | 479 (4.89) | 5.50 | 95.87 | 58.3 |
| 5-2 | 3.49 | 526 (5.37) | 5.80 | 96.30 | 92.6 |
| 5-3 | 3.49 | 588 (6.00) | 6.00 | 96.49 | 115.8 |
| 5-4 | 3.49 | 684 (6.98) | 6.20 | 96.73 | 124.2 |

The powder of example 2, test 5, according to the invention, led to pellets with remarkable characteristics.

The crude pellets are very strong, which is an advantage from the handling standpoint. Most of the fritted densities are above 96% and in all cases exceed the minimum required, whereas, without activation, it was not possible to obtain 90% of the theoretical density, even with a granulation operation.

We claim:

1. Process for obtaining nuclear fuel pellets based on $UO_2$ from metallic uranium, which does not lead to liquid effluents and gives intermediate, dense, pourable uranium oxide powders without any particular conditioning operation, such as granulation, comprising the steps of: oxidizing metallic uranium in an oxidizing gas at high temperature to obtain an oxide $U_3O_8$; crushing or milling the $U_3O_8$ to obtain a powder with an average grain size of approximately 10 to 30 μm; chemically reducing the $U_3O_8$ to $UO_2$; activating the $UO_2$ with the aid of at least one fine milling operation; and shaping by pressing and fritting.

2. Process according to claim 1, wherein the metallic uranium is oxidized by air or oxygen in the pure state or diluted by a neutral gas at a temperature not exceeding 600° C.

3. Process according to claim 1, wherein the metallic uranium is oxidized in the presence of steam at a temperature not exceeding 800° C.

4. Process according to any one of the claims 1 to 2, wherein the fine milling is a fluidized bed gas jet milling.

5. Process according to any one of the claims 1 to 3, wherein the oxidation phase of an oxidation-reduction cycle is performed with the aid of air or oxygen in the pure state or diluted by a neutral gas at a temperature not exceeding 600° C.

6. Process according to any one of the claims 1 to 3, wherein the activated uranium oxide powder has a specific surface between 1.7 and 3.5 m²/g.

7. Process according to any one of the claims 1 to 3, wherein prior to shaping, the activated $UO_2$ powder is mixed with a metallic oxide in order to obtain mixed oxide fuel pellets.

8. Process according to claim 2, wherein the metallic uranium is oxidized by air or oxygen in the pure state or diluted by a neutral gas at a temperature between 400° and 550° C.

9. Process according to claim 3, wherein the metallic uranium is oxidized in the presence of steam at a temperature between 600° and 750° C.

10. Process according to claim 1, wherein activation of the $UO_2$ is completed by at least one redox cycle.

11. Process for obtaining nuclear fuel pellets based on $UO_2$ from metallic uranium, which does not lead to liquid effluents and gives intermediate, dense, pourable uranium oxide powders without any particular conditioning operation, such as granulation, comprising the steps of: oxidizing metallic uranium in an oxidizing gas at high temperature to obtain an oxide $U_3O_8$; crushing or milling the $U_3O_8$ to obtain a powder with an average grain size of approximately 10 to 30 μm; activating the powder with the aid of at least one fine milling operation; chemically reducing the $U_3O_8$ to $UO_2$; and shaping by pressing and fritting.

12. Process according to claim 11, wherein the metallic uranium is oxidized by air or oxygen in the pure state or diluted by a neutral gas at a temperature not exceeding 600° C.

13. Process according to claim 11, wherein the metallic uranium is oxidized in the presence of steam at a temperature not exceeding 800° C.

14. Process according to any one of the claims 11 to 13, wherein the fine milling is a fluidized bed gas jet milling.

15. Process according to any one of the claims 11 to 13, wherein the oxidation phase of an oxidation-reduction is performed with the aid of air or oxygen in the pure state or diluted by a neutral gas at a temperature not exceeding 600° C.

16. Process according to any one of the claims 11 to 13, wherein the activated uranium oxide powder has a specific surface between 1.7 and 3.5 $m^2/g$.

17. Process according to any one of the claims 11 to 13, wherein prior to shaping, the activated $UO_2$ powder is mixed with a metallic oxide in order to obtain mixed oxide fuel pellets.

18. Process according to claim 12, wherein the metallic uranium is oxidized by air or oxygen in the pure state or diluted by a neutral gas at a temperature between 400° and 550° C.

19. Process according to claim 11, wherein the metallic uranium is oxidized in the presence of steam at a temperature between 600° and 750° C.

20. Process according to claim 11, wherein the oxidation phase of an oxidation-reduction is performed with the aid of air or oxygen in the pure state or diluted by a neutral gas at a temperature between 400° and 500° C.

21. Process according to claim 11, wherein activation of the $UO_2$ is completed by at least one oxidation-reduction cycle.

22. Process for obtaining nuclear fuel pellets based on $UO_2$ from metallic uranium, which does not lead to liquid effluents and gives intermediate, dense, pourable uranium oxide powders without any particular conditioning operation, such as granulation, comprising the steps of: oxidizing metallic uranium in an oxidizing gas at high temperature to obtain an oxide $U_3O_8$; crushing or milling the $U_3O_8$ to obtain a powder with an average grain size of approximately 10 to 30 μm; chemically reducing the $U_3O_8$ to $UO_2$; activating the $UO_2$ with the aid of at least one oxidation-reduction cycle; and shaping by pressing and fritting.

23. Process according to claim 22, wherein the metallic uranium is oxidized by air or oxygen in the pure state or diluted by a neutral gas at a temperature not exceeding 600° C.

24. Process according to claim 22, wherein the metallic uranium is oxidized in the presence of steam at a temperature between 600° and 750° C.

25. Process according to claim 22, wherein the metallic uranium is oxidized in the presence of steam at a temperature not exceeding 800° C.

26. Process according to any one of the claims 22 to 25, wherein the fine milling is a fluidized bed gas jet milling.

27. Process according to any one of the claims 22 to 25 wherein the oxidation phase of an oxidation-reduction cycle is performed with the aid of air or oxygen in the pure state or diluted by a neutral gas at a temperature not exceeding 600° C.

28. Process according to any one of the claims 22 to 25, wherein the activated uranium oxide powder has a specific surface between 1.7 and 3.5 $m^2/g$.

29. Process according to any one of the claims 22 to 25, wherein prior to shaping, the activated $UO_2$ powder is mixed with a metallic oxide in order to obtain mixed oxide fuel pellets.

30. Process according to claim 23, wherein the metallic uranium is oxidized by air or oxygen in the pure state or diluted by a neutral gas at a temperature between 400° and 500° C.

31. Process according to claim 22, wherein the metallic uranium is oxidized in the presence of steam at a temperature between 600° and 750° C.

32. Process according to claim 22, wherein the oxidation phase of an oxidation-reduction cycle is performed with the aid of air or oxygen in the pure state or diluted by a neutral gas at a temperature between 400° and 500° C.

* * * * *